(12) United States Patent
Wada et al.

(10) Patent No.: US 11,456,684 B2
(45) Date of Patent: Sep. 27, 2022

(54) ELECTRIC MOTOR CONTROL DEVICE

(71) Applicant: Mitsubishi Electric Corporation, Tokyo (JP)

(72) Inventors: Yasuhiko Wada, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 17/270,889

(22) PCT Filed: Nov. 2, 2018

(86) PCT No.: PCT/JP2018/040875
§ 371 (c)(1),
(2) Date: Feb. 24, 2021

(87) PCT Pub. No.: WO2020/090115
PCT Pub. Date: May 7, 2020

(65) Prior Publication Data
US 2021/0184604 A1 Jun. 17, 2021

(51) Int. Cl.
*H02P 5/50* (2016.01)
*H02P 21/18* (2016.01)
*H02P 21/22* (2016.01)

(52) U.S. Cl.
CPC ............... *H02P 5/50* (2013.01); *H02P 21/18* (2016.02); *H02P 21/22* (2016.02)

(58) Field of Classification Search
CPC ............. H02P 5/50; H02P 21/18; H02P 21/22
(Continued)

(56) References Cited

U.S. PATENT DOCUMENTS

2014/0217812 A1 8/2014 Sugiyama et al.
2017/0294864 A1* 10/2017 Tada .................. H02P 29/50
(Continued)

FOREIGN PATENT DOCUMENTS

JP 2010-029016 A 2/2010
JP 2014-150664 A 8/2014

OTHER PUBLICATIONS

International Search Report of the International Searching Authority dated Jan. 29, 2019 for the corresponding international application No. PCT/JP2018/040875 (and English translation).
(Continued)

*Primary Examiner* — Erick D Glass
(74) *Attorney, Agent, or Firm* — Posz Law Group, PLC

(57) ABSTRACT

An electric motor control device that drives and controls a plurality of electric motors connected in parallel, includes: a power conversion device; a current detection device; and a controller that includes a first control unit to perform first control on each of the plurality of electric motors based on the electric current, a second control unit to perform second control of controlling the plurality of electric motors such that an estimated speed of each of the plurality of electric motors obtained based on the current value follows the speed command value, and a switching determination unit to perform switching determination processing of switching between the first control performed by the first control unit and the second control performed by the second control unit according to drive information on at least one or more of the plurality of electric motors.

13 Claims, 5 Drawing Sheets

(58) Field of Classification Search
USPC .......................................................... 318/98
See application file for complete search history.

(56) References Cited

U.S. PATENT DOCUMENTS

| | | | |
|---|---|---|---|
| 2020/0098321 A1* | 3/2020 | Cooper ............. | G02F 1/133602 |
| 2021/0254841 A1* | 8/2021 | Takayama ............... | H02P 21/26 |
| 2021/0305921 A1* | 9/2021 | Hatakeyama ....... | H02M 7/5395 |

OTHER PUBLICATIONS

Office Action dated Nov. 2, 2021, issued in corresponding JP Patent Application No. 2020-554738 (and English Machine Translation).

* cited by examiner

ELECTRIC MOTOR CONTROL DEVICE

CROSS REFERENCE TO RELATED APPLICATION

This application is a U.S. national stage application of International Patent Application No. PCT/JP2018/040875 filed on Nov. 2, 2018, the disclosure of which is incorporated herein by reference.

TECHNICAL FIELD

The invention relates to an electric motor control device, and particularly to control when two or more electric motors are driven by a single inverter device.

BACKGROUND

Conventionally, there is an electric motor control device that can switch between a synchronous operation mode, in which synchronous current control is performed, and a position sensorless mode, in which sensorless vector control is performed, when an AC rotating machine being an electric motor is driven. In such an electric motor control device, the phase of a current command value set in advance is caused to be substantially aligned with the phase of an estimated axis error to cause a control phase to be aligned with the actual phase of the motor. Thereafter, the electric motor control device switches from the synchronous operation mode, in which the synchronous current control is performed, to the position sensorless mode, in which the sensorless vector control is performed, and then drives the AC rotating machine. As described above, the control phase is caused to be aligned with the actual phase of the motor and, thereafter, the electric motor control device performs switching and hence, shock caused at the time of switching can be reduced whereby it is possible to smoothly drive the AC rotating machine.

During the period in which the phase of the current command value and the phase of the estimated axis error are caused to be substantially aligned with each other, the axis error can be correctly estimated, thus during this period, the AC rotating machine can be driven even in the position sensorless mode. The position sensorless mode can automatically adjust an electric current according to a deviation between a speed command and an estimated speed. Therefore, even when a high load is applied, it is possible to drive the AC rotating machine (see Patent Literature 1, for example).

PATENT LITERATURE

Patent Literature 1: Japanese Unexamined Patent Application Publication No. 2010-029016

However, the method disclosed in Patent Literature 1 fails to take into account the case where two or more electric motors are operated. Therefore, there is a problem that when a higher load is generated in either one of the electric motors, thus causing a deviation in load between the electric motors, the acceleration operation of the electric motor fails in many cases.

SUMMARY

The invention has been made to solve the above-mentioned problem, and it is an object of the invention to provide an electric motor control device that can increase certainty that two or more electric motors are driven after being accelerated to a high speed.

An electric motor control device according to an embodiment of the invention is an electric motor control device that drives and controls a plurality of electric motors connected in parallel, the electric motor control device including: a power conversion device configured to convert power from a power supply, and to supply the power to the plurality of electric motors; a current detection device configured to detect an electric current flowing through each of the plurality of electric motors; and a controller configured to control the power conversion device according to a speed command value from an external device and a current value relating to detection from the current detection device, wherein the controller includes a first control unit configured to perform first control on each of the plurality of electric motors based on the electric current, a second control unit configured to perform second control of controlling the plurality of electric motors such that an estimated speed of each of the plurality of electric motors obtained based on the current value follows the speed command value, and a switching determination unit configured to perform switching determination processing of switching between the first control performed by the first control unit and the second control performed by the second control unit according to drive information on at least one or more of the plurality of electric motors.

According to the electric motor control device of the embodiment of the invention, the switching determination unit switches between the first control and the second control according to the speed command value and the drive information on the electric motor. Therefore, it is possible to switch while taking into account load characteristics of the respective electric motors and hence, it is possible to increase certainty for simultaneously driving two or more electric motors to a high speed.

DETAILED DESCRIPTION

Figure 1:
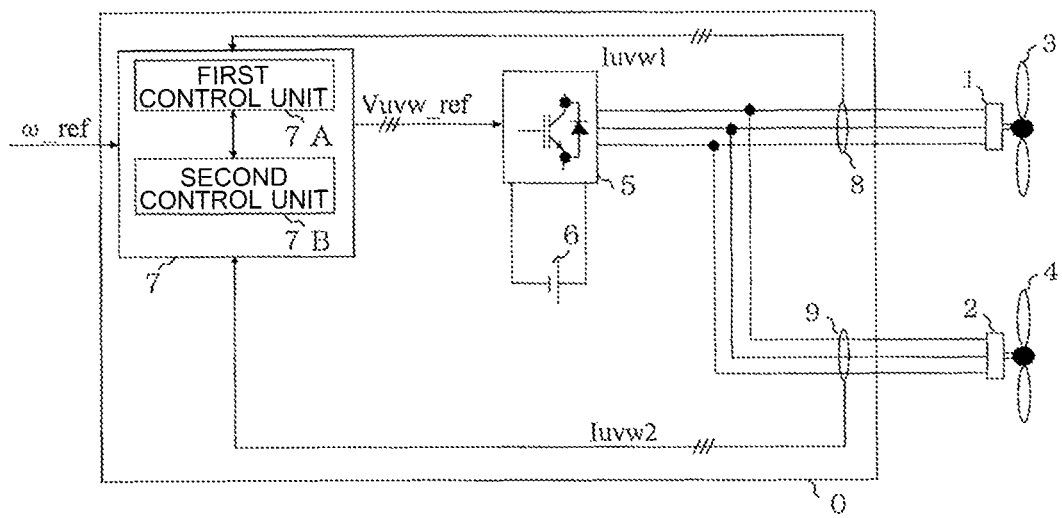
FIG. 1 is a diagram showing one constitutional example of an air-sending system, focusing on an electric motor control device 0 according to Embodiment 1 of the invention.

Hereinafter, electric motor control devices 0 according to Embodiments of the invention will be described with reference to drawings and the like. In the respective drawings, components given the same reference characters are identical or corresponding components, and the same goes for the entire of Embodiments described hereinafter. Further, modes of constitutional elements described in entire DESCRIPTION are merely for the purpose of example, and are not limited to modes described in DESCRIPTION. Particularly, the combination of the constitutional elements is not limited to the combination in each Embodiment, and constitutional elements described in one embodiment may be used in other Embodiments. Further, a high or a low of pressure or temperature is not particularly determined based on the relationship with the absolute value, but is determined relatively based on the state, the operation, or the like of the device. In the drawings, the relationship of sizes of the respective constitutional elements, such as equipment and an element, may differ from that of the actual ones.

Embodiment 1

An electric motor control device 0 of Embodiment 1 will be described with reference to FIG. 1 to FIG. 6. FIG. 1 is a diagram showing one constitutional example of an air-sending system, focusing on the electric motor control device 0 according to Embodiment 1 of the invention. As shown in FIG. 1, the electric motor control device 0 includes a controller 7 and one inverter 5 that converts a DC voltage to a three-phase AC voltage. The electric motor control device 0 drives and controls a first electric motor 1 and a second electric motor 2. A plurality of electric motors, that is, the first electric motor 1 and the second electric motor 2, which are objects to be controlled by the electric motor control device 0, are connected in parallel to the inverter 5. A first fan 3 is attached to the first electric motor 1. Further, a second fan 4 is attached to the second electric motor 2.

The first electric motor 1 is connected with the inverter 5 via a three-phase power line. The second electric motor 2 is connected with the inverter 5 via a three-phase power line branched from the intermediate portion of the three-phase power line. Each of the first electric motor 1 and the second electric motor 2 includes a rotor and a stator not shown in the drawing. The stator generates a rotating magnetic field around the rotor according to a three-phase voltage applied. The inverter 5 is a power conversion device that performs DC-AC conversion on power from a DC power supply 6, and supplies the converted power to the first electric motor 1 and the second electric motor 2.

Based on a three-phase voltage command value Vuvw_ref contained in a signal from the controller 7, the inverter 5 compares the waveform of the three-phase voltage command value Vuvw_ref with a carrier wave, and performs power conversion by PWM control. The DC power supply 6 is a DC voltage power supply that supplies power to the first electric motor 1 and the second electric motor 2 via the inverter 5. For example, although not shown in the drawing, the DC power supply 6 may be a circuit that includes a diode rectifier circuit to convert an AC voltage supplied from an external three-phase power supply to a DC voltage, and to output the DC voltage.

A first current sensor 8 being a current detection device detects a three-phase current Iuvw1 flowing into the first electric motor 1, and transmits a signal relating to the current value to the controller 7. Further, a second current sensor 9 being a current detection device detects a three-phase current Iuvw2 flowing into the second electric motor 2, and transmits a signal relating to the current value to the controller 7. It may be configured such that a shunt resistor is mounted in the inverter 5 as a current detection device in place of the first current sensor 8 and the second current sensor 9, and an electric current is detected from a voltage drop of the shunt resistor.

Based on processing performed by a first control unit 7A and processing performed by a second control unit 7B described later, the controller 7 outputs the three-phase voltage command value Vuvw_ref according to a speed command value ω_ref, the three-phase current Iuvw1 flowing into the first electric motor 1, and the three-phase current Iuvw2 flowing into the second electric motor 2. The controller 7 controls the inverter 5 being a power conversion device. The first control unit 7A performs d-axis current feedback control based on the magnetic field component, the feedback control being the first control. Further, the second control unit 7B performs speed feedback control being the second control, d axis current feedback control, and q axis current feedback control based on the torque component to adjust the three-phase voltage command value Vuvw_ref to be applied to the inverter 5. In other words, voltage control is performed on the inverter 5 such that an estimated speed obtained based on a current value follows a speed command value in each electric motor. The controller 7 also performs control of switching between the first control and the second control.

Figure 2:
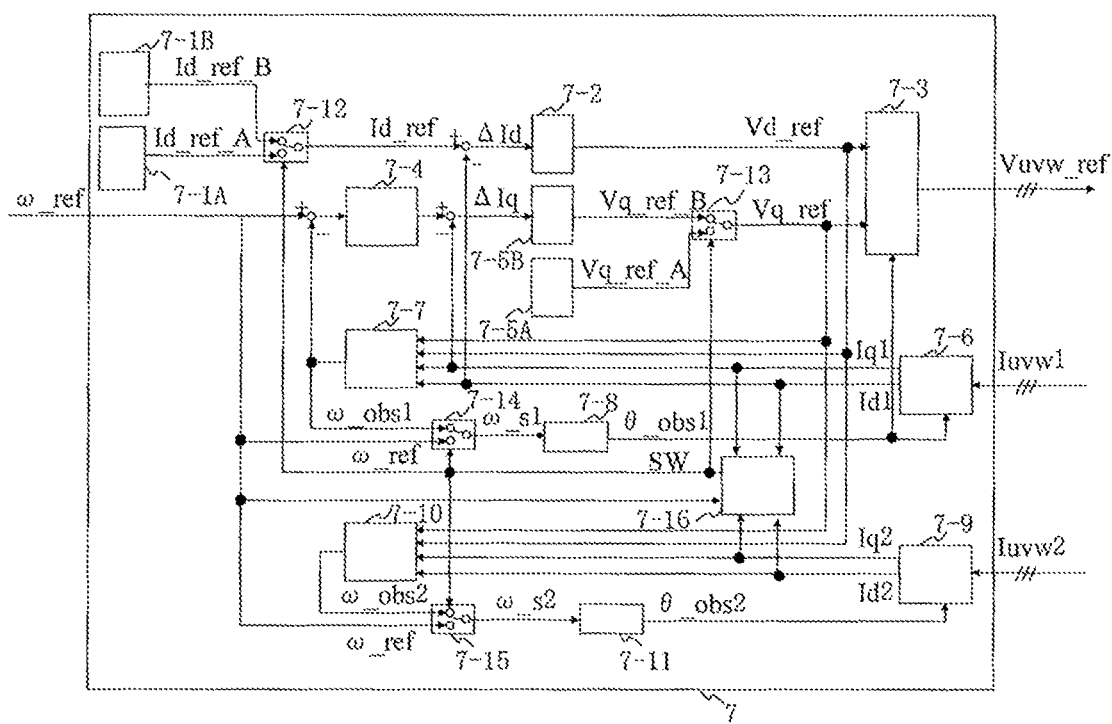
FIG. 2 is a diagram for mainly describing a configuration of a controller 7 according to Embodiment 1 of the invention.

FIG. 2 is a diagram for mainly describing a configuration of the controller 7 according to Embodiment 1 of the invention. The controller 7 of the electric motor control device 0 will be described in detail with reference to FIG. 2. The controller 7 includes the first control unit 7A and the second control unit 7B. The first control unit 7A includes a first d-axis current command value setting device 7-1A and a q-axis voltage command value setting device 7-5A. The second control unit 7B includes a second d-axis current command value setting device 7-1B and a q-axis current control device 7-5B. The controller 7 also includes a d-axis current control device 7-2, an output coordinate converter 7-3, and a speed controller 7-4. The controller 7 also includes a first coordinate converter 7-6, a first speed estimator 7-7, a first integrator 7-8, a second coordinate converter 7-9, a second speed estimator 7-10, and a second integrator 7-11. The controller 7 further includes a first switcher 7-12, a second switcher 7-13, a third switcher 7-14, a fourth switcher 7-15, and a switching determination unit 7-16.

Next, the respective constitutional elements of the controller 7 will be described. The first d-axis current command value setting device 7-1A of the first control unit 7A outputs a d-axis current command value Id_ref_A to the first switcher 7-12. For example, for a set value of the d-axis current command value Id_ref_A, the current value is set that is required to allow the same DC current to flow through the stator coils of the two electric motors, thus exciting the stators such that the respective magnetic poles of the stators have the same polarity, the current value being required to attract the rotors of the respective electric motors, each having a permanent magnet, to the positions at the same phase angle. In other words, it is sufficient to set a current value C1 that is equal to or less than a demagnetizing current value of the first electric motor 1 and the second electric motor 2, and that can perform a synchronization pull-in operation even under the condition where a load is generated in the first electric motor 1 and the second electric motor 2.

The second d-axis current command value setting device 7-1B outputs a d-axis current command value Id_ref_B to the first switcher 7-12. During the rotation of the first electric motor 1 and the second electric motor 2 at a high speed, the d-axis current command value Id_ref_A may cause overexcitation, thus decreasing the efficiency of the first electric motor 1 and the second electric motor 2. In view of the above, the set value of the d-axis current command value Id_ref_B is set to a value that is lower than the d-axis current command value Id_ref_A. For example, the d-axis current command value Id_ref_B may be set to a value that gradually decreases corresponding to the speed command value ω_ref. Therefore, it is possible to prevent the overexcitation of the first electric motor 1 and the second electric motor 2, so that efficiency can be increased.

The d-axis current control device 7-2 performs proportional integral control on a deviation ΔId between the d-axis current command value Id_ref outputted from the first switcher 7-12 and a d-axis current value Id1 of the first electric motor 1 outputted from the first coordinate converter 7-6. Then, the d-axis current control device 7-2 outputs a d-axis voltage command value Vd_ref to the output coordinate converter 7-3, the first speed estimator 7-7 and the second speed estimator 7-10.

The output coordinate converter 7-3 performs coordinate conversion processing based on the d-axis voltage command value Vd_ref outputted from the d-axis current control device 7-2, a q-axis voltage command value Vq_ref outputted from the second switcher 7-13, and an estimated phase value θ_obs1 of the first electric motor 1 outputted from the first integrator 7-8. Then, the output coordinate converter 7-3 outputs the three-phase voltage command value Vuvw_ref to the inverter 5.

The speed controller 7-4 performs proportional integral control on a deviation Δω between the speed command value ω_ref and an estimated speed value ω_obs1 of the first electric motor 1 outputted from the first speed estimator 7-7. Then, the speed controller 7-4 outputs a q-axis current command value Iq_ref.

The q-axis voltage command value setting device 7-5A of the first control unit 7A outputs a voltage command value Vd_ref_A to the second switcher 7-13.

Assume a case where a switching signal SW outputted from the switching determination unit 7-16 is "OFF". In such a case, by setting the voltage command value Vd_ref_A to 0[A], only the d-axis current control is allowed to become valid. Therefore, it is possible to perform the d-axis current feedback control on the first electric motor 1 and the second electric motor 2.

The q-axis current control device 7-5B of the second control unit 7B performs proportional integral control based on a deviation ΔIq between the q-axis current command value Iq_ref outputted from the speed controller 7-4 and a q-axis current Iq1 of the first electric motor 1 outputted from the first coordinate converter 7-6. Then, the q-axis current control device 7-5B outputs a q-axis voltage command value Vq_ref_B to the second switcher 7-13.

The first coordinate converter 7-6 performs coordinate conversion processing based on the three-phase current Iuvw1 of the first electric motor 1 and the estimated phase value θ_obs1 of the first electric motor 1 outputted from the first integrator 7-8. Then, the first coordinate converter 7-6 outputs the d-axis current value Id1 of the first electric motor 1 and a q-axis current value Iq1 of the first electric motor 1 to the first speed estimator 7-7 and the switching determination unit 7-16.

The first speed estimator 7-7 performs estimation calculation of the estimated speed value ω_obs1 of the first electric motor 1 based on the d-axis voltage command value Vd_ref outputted from the d-axis current control device 7-2, the q-axis voltage command value Vq_ref outputted from the second switcher 7-13, and the d-axis current value Id1 and the q-axis current value Iq1 of the first electric motor 1 outputted from the first coordinate converter 7-6. The first speed estimator 7-7 performs estimation calculation by using, but not particularly limited to, the adaptive magnetic flux observer, which is a known technique, for example. In Embodiment 1, the detailed description of the adaptive magnetic flux observer will be omitted. The adaptive magnetic flux observer is excellent in that the adaptive magnetic flux observer is robust to fluctuations in the number of flux linkages, and a steady speed estimation error does not occur. Therefore, the adaptive magnetic flux observer is widely recognized as a high-performance method for estimating a speed.

The first integrator 7-8 performs integration processing on an estimated speed value ω_s1 relating to the first electric motor 1 and outputted from the third switcher 7-14 to generate the estimated phase value θ_obs1 of the first electric motor 1. Then, the first integrator 7-8 outputs the estimated phase value θ_obs1 of the first electric motor 1 to the output coordinate converter 7-3 and the first coordinate converter 7-6.

The second coordinate converter 7-9 performs coordinate conversion processing based on the three-phase current Iuvw2 of the second electric motor 2 and an estimated phase value θ_obs2 of the second electric motor 2 outputted from the second integrator 7-11. Then, the second coordinate converter 7-9 outputs a d-axis current value Id2 of the second electric motor 2 and a q-axis current value Iq2 of the second electric motor 2 to the second speed estimator 7-10 and the switching determination unit 7-16.

The second speed estimator 7-10 has a function substantially equal to the function of the first speed estimator 7-7. The second speed estimator 7-10 performs estimation calculation of an estimated speed value ω_obs2 of the second electric motor 2 based on the d-axis voltage command value Vd_ref outputted from the d-axis current control device 7-2, the q-axis voltage command value Vq_ref outputted from the second switcher 7-13, and a d-axis current Id2 and a q-axis current Iq2 of the second electric motor 2 outputted from the first coordinate converter 7-6. In the same manner as the first speed estimator 7-7, the second speed estimator 7-10 also performs estimation calculation by using the adaptive magnetic flux observer, which is a known technique.

The second integrator 7-11 performs integration processing on an estimated speed value ω_52 relating to the second electric motor 2 and outputted from the fourth switcher 7-15 to generate the estimated phase value θ_obs2 of the second electric motor 2. Then, the second integrator 7-11 outputs the estimated phase value θ_obs2 of the second electric motor 2 to the second coordinate converter 7-9.

The first switcher 7-12 selects either one of the d-axis current command value Id_ref_A or the d-axis current command value Id_ref_B based on the switching signal SW outputted from the switching determination unit 7-16, and outputs the selected d-axis current command value as the d-axis current command value Id_ref. At this point of operation, when the switching signal SW is "OFF", the first switcher 7-12 selects the d-axis current command value Id_ref_A of the first control unit 7A. In contrast, when the switching signal SW is "ON", the first switcher 7-12 selects the d-axis current command value Id_ref_B.

The second switcher 7-13 selects either one of the q-axis voltage command value Vq_ref_A or the q-axis voltage command value Vq_ref_B based on the switching signal SW outputted from the switching determination unit 7-16, and outputs the selected q-axis voltage command value as the q-axis voltage command value Vq_ref. The second switcher 7-13 outputs the q-axis voltage command value Vq_ref to the output coordinate converter 7-3, the first speed estimator 7-7, and the second speed estimator 7-10. At this point of operation, when the switching signal SW is "OFF", the second switcher 7-13 selects the q-axis voltage command value Vq_ref_A. In contrast, when the switching signal SW is "ON", the second switcher 7-13 selects the q-axis voltage command value Vq_ref_B. When the q-axis voltage command value Vq_ref_B is selected, voltage control is performed on the inverter 5 by performing the speed feedback control, the d axis current feedback control, and the q axis current feedback control.

The third switcher 7-14 selects either one of the speed command value w_ref or the estimated speed value w_obs1 of the first electric motor 1 outputted from the first speed estimator 7-7 based on the switching signal SW outputted from the switching determination unit 7-16. Then, the third switcher 7-14 outputs the selected value to the first integrator 7-8 as the estimated speed value ω_s1 of the first electric motor 1. At this point of operation, when the switching signal SW is "OFF", the third switcher 7-14 selects the speed command value ω_ref. In contrast, when the switching signal SW is "ON", the third switcher 7-14 selects the estimated speed value ω_obs1 of the first electric motor 1.

The fourth switcher 7-15 selects either one of the speed command value ω_ref or the estimated speed value ω_obs2 of the second electric motor 2 outputted from the second speed estimator 7-10 based on the switching signal SW outputted from the switching determination unit 7-16. Then, the fourth switcher 7-15 outputs the selected value to the second integrator 7-11 as the estimated speed value ω_52 of the second electric motor 2. At this point of operation, when the switching signal SW is "OFF", the fourth switcher 7-15 selects the speed command value ω_ref. In contrast, when the switching signal SW is "ON", the fourth switcher 7-15 selects the estimated speed value ω_obs2 of the second electric motor 2.

The switching determination unit 7-16 transmits the switching signal SW to the first switcher 7-12 to the fourth switcher 7-15 based on the d-axis current value Id1 and the q-axis current Iq1 of the first electric motor 1 outputted from the first coordinate converter 7-6, the d-axis current Id2 and the q-axis current Iq2 of the second electric motor 2 outputted from the second coordinate converter 7-9, and the speed command value w_ref. When the switching signal SW transmitted by the switching determination unit 7-16 is "OFF", the first control is performed. In contrast, when the switching signal SW is "ON", the second control is performed. The Control of accelerating the first electric motor 1 and the second electric motor 2 to a high speed is performed by performing either one of the first control or the second control based on the processing performed by the switching determination unit 7-16.

Figure 3:
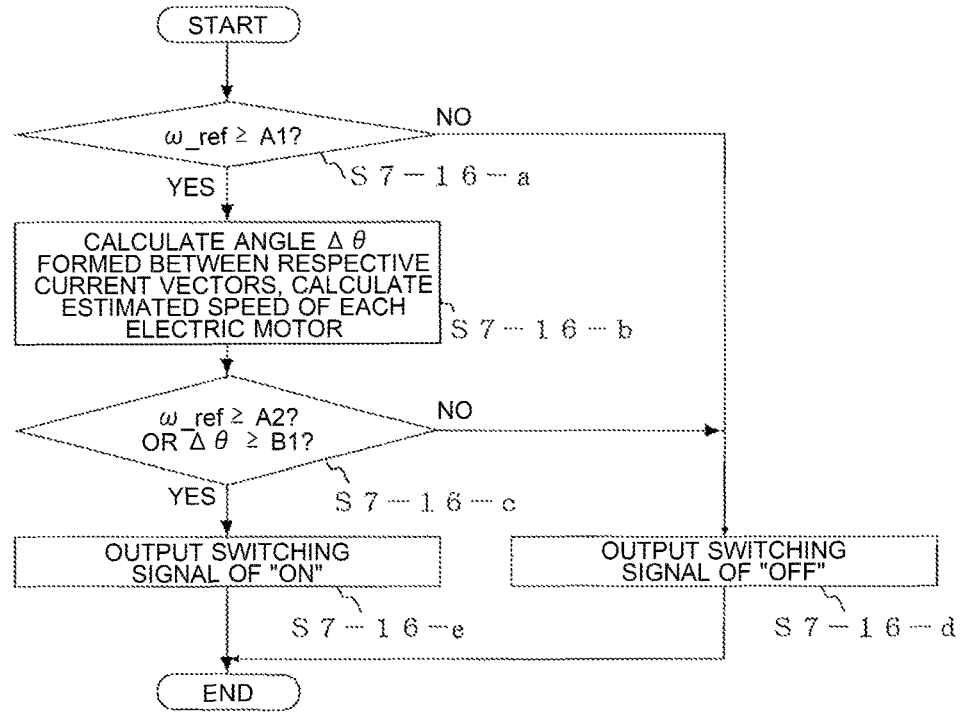
FIG. 3 is a chart for describing a procedure of switching determination processing in Embodiment 1 of the invention.

FIG. 3 is a chart for describing a procedure of switching determination processing in Embodiment 1 of the invention. Next, the switching determination processing will be described focusing on the switching determination unit 7-16.

The switching determination unit 7-16 determines whether the speed command value ω_ref is equal to or greater than a speed threshold A1 set in advance (step S7-16-*a*). A value smaller than a speed threshold A2 described later is set in advance as the speed threshold A1. For example, the speed threshold A1 is set to a value of 5 [%] of the maximum speed of the first electric motor 1 and the second electric motor 2. Further, the speed threshold A2 is set to a value of 10 [%] of the maximum speed of the first electric motor 1 and the second electric motor 2.

When the switching determination unit 7-16 determines that the speed command value ω_ref is not equal to or greater than the speed threshold A1, but is less than the speed threshold A1, the switching determination unit 7-16 transmits a switching signal SW of "OFF" (step S7-16-*d*). In contrast, when the switching determination unit 7-16 determines that the speed command value ω_ref is equal to or greater than the speed threshold A1, the processing advances to step S7-16-*b*.

Figure 4:
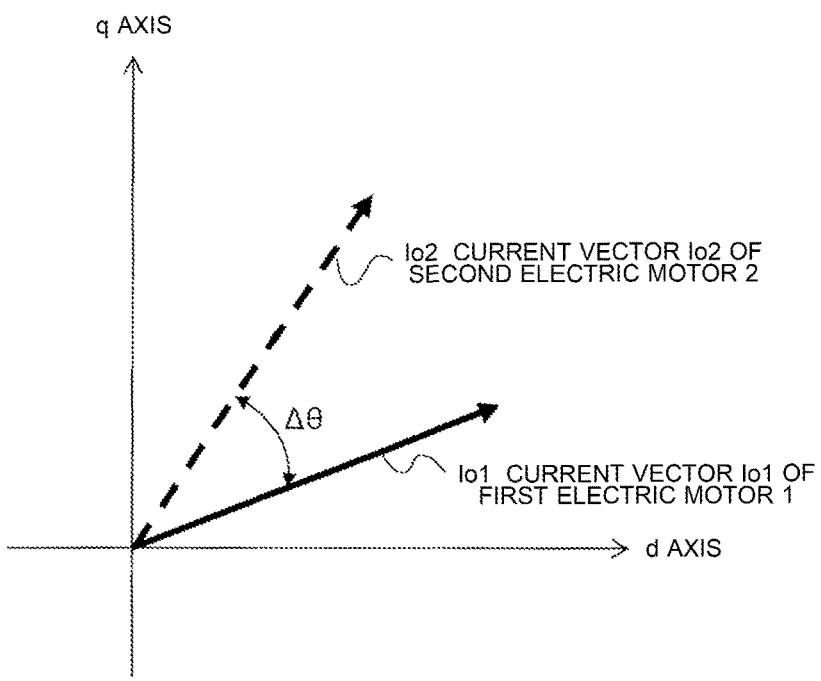
FIG. 4 is a graph showing one example of current vectors of a first electric motor 1 and a second electric motor 2 when the first electric motor 1 and the second electric motor 2 are driven at a certain speed in the electric motor control device 0 according to Embodiment 1 of the invention.

FIG. 4 is a graph showing one example of current vectors of the first electric motor 1 and the second electric motor 2 when the first electric motor 1 and the second electric motor 2 are driven at a certain speed in the electric motor control device 0 according to Embodiment 1 of the invention. The current vectors of the first electric motor 1 and the second electric motor 2 will be described with reference to FIG. 4. A solid line in FIG. 4 shows a current vector Io1 of the first electric motor 1. Further, a dotted line in FIG. 4 shows a current vector Io2 of the second electric motor 2. An angle formed between the current vector Io1 and the current vector Io2 is defined as Δθ. Even when the first electric motor 1 and the second electric motor 2 are operated at the same speed, the first electric motor 1 and the second electric motor 2 differ in the manner of applying a load. Therefore, the current vector Io1 of the first electric motor 1 and the current vector Io2 of the second electric motor 2 differ in direction. Accordingly, when an extremely high load is applied to either one of the electric motors, the angle Δθ formed between the current vector Io1 and the current vector Io2 increases.

Figure 5:
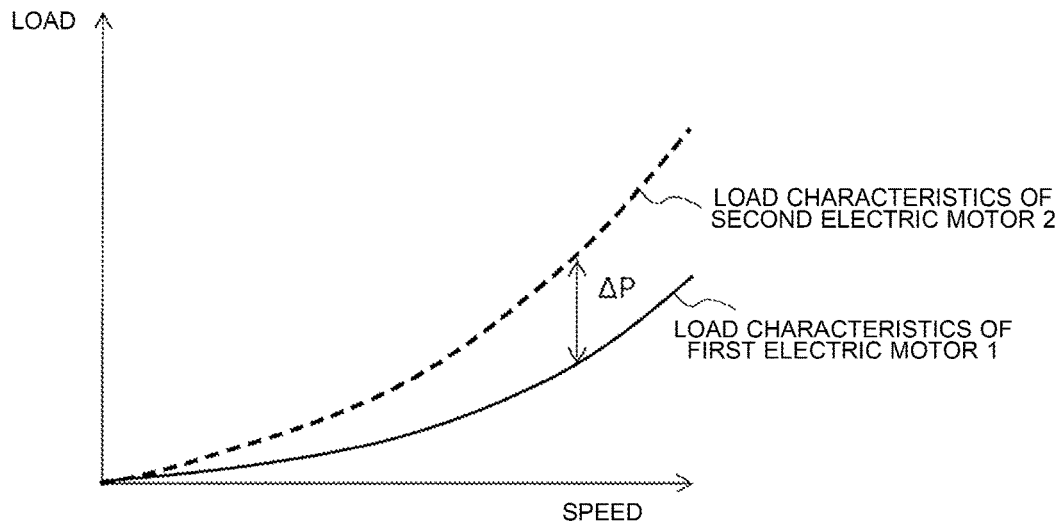
FIG. 5 is a graph showing one example of load characteristics of the first electric motor 1 and the second electric motor 2 in Embodiment 1 of the invention.

FIG. 5 is a graph showing one example of load characteristics of the first electric motor 1 and the second electric motor 2 in Embodiment 1 of the invention. FIG. 5 shows load characteristics of the first electric motor 1 and the second electric motor 2, with the horizontal axis showing speed, and the vertical axis showing a load on the fan. Next, the load characteristics of the first electric motor 1 and the second electric motor 2 will be described with reference to FIG. 5. Although not shown in the drawings, in the configuration where the first electric motor 1 and the second electric motor 2 are housed in a housing, for example, a flow passage for air generated in the housing is decided. In this case, the load characteristics of the first electric motor 1 and the second electric motor 2 are such that the load increases with an increase in speed of the first electric motor 1 and the second electric motor 2. A load difference ΔP between the first electric motor 1 and the second electric motor 2 also increases with an increase in speed of the first electric motor 1 and the second electric motor 2. Therefore, the angle Δθ shown in FIG. 4 formed between the current vector Io1 and the current vector Io2 also increases with an increase in the load difference ΔP.

Figure 6:
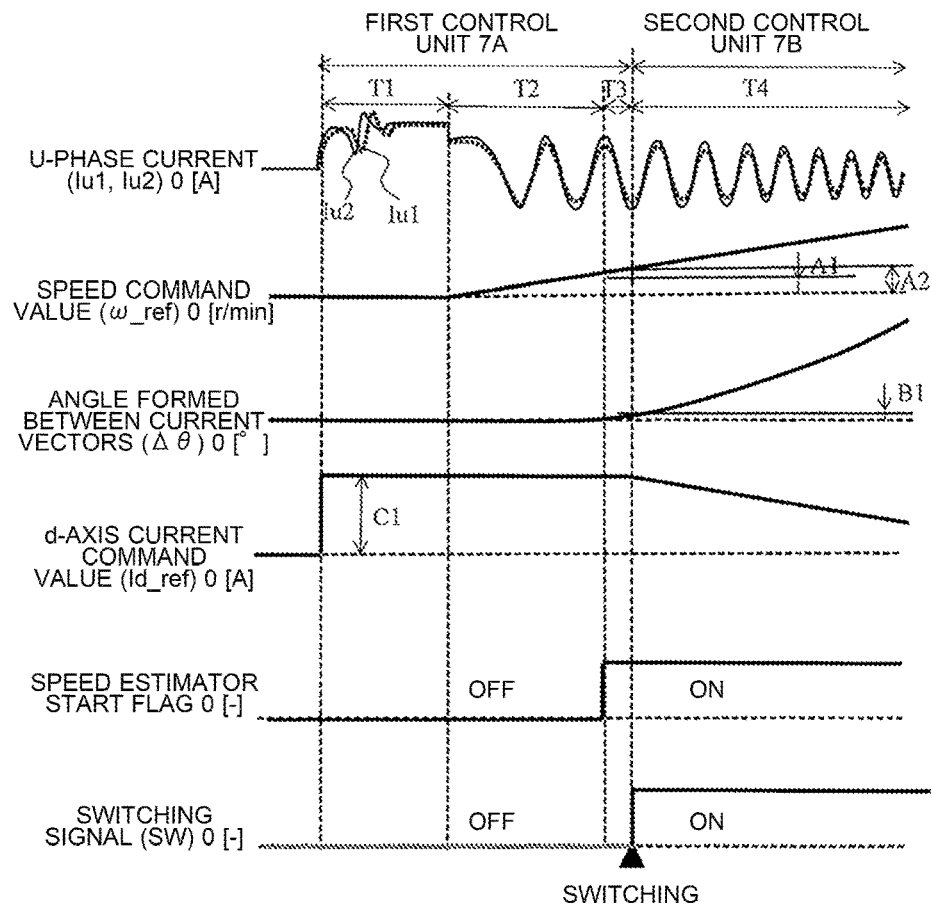
FIG. 6 is a graph showing relationship of a signal and the like in Embodiment 1 of the invention.

In step S7-16-*b* shown in FIG. 3, the switching determination unit 7-16 transmits a signal for switching speed estimator start flags of the first speed estimator 7-7 and the second speed estimator 7-10 to "ON" as shown in FIG. 6, which will be described later. Then, the switching determination unit 7-16 causes the first speed estimator 7-7 to start the calculation of the estimated speed value ω_obs1 of the first electric motor 1. The switching determination unit 7-16 also causes the second speed estimator 7-10 to start the calculation of the estimated speed value ω_obs2 of the second electric motor 2.

Further, the switching determination unit 7-16 calculates the current vector Io1 of the first electric motor 1 and the current vector Io2 of the second electric motor 2 from the d-axis current value Id1 and the q-axis current Iq1 of the first electric motor 1 and from the d-axis current Id2 and the q-axis current Iq2 of the second electric motor 2. Then, the calculation of the angle Δθ formed between the current vector Io1 and the current vector Io2 is started, the angle Δθ being drive information which determines control switching.

In step S7-16-*b*, it is sufficient that, before the first control unit 7A and the second control unit 7B are switched, the first speed estimator 7-7 start the calculation of the estimated speed value ω_obs1 of the first electric motor 1, and the second speed estimator 7-10 start the calculation of the estimated speed value ω_obs2 of the second electric motor 2. For example, in the case where the switching determination unit 7-16 has a timer function, the switching determination unit 7-16 may be adjusted to transmit a signal for switching a calculation start flag to "ON" before the first control unit 7A and the second control unit 7B are switched.

After the switching determination unit 7-16 transmits the signal for switching the speed estimator start flag to "ON", the switching determination unit 7-16 determines whether a switching condition is satisfied (step S7-16-*c*). The switching conditions are as follows. The speed command value w_ref is equal to or greater than the speed threshold A2 set in advance. The calculated angle Δθ formed between the current vector Io1 and the current vector Io2 is equal to or greater than an angle threshold B1 set in advance. In Embodiment 1, when either one of the above-mentioned conditions is satisfied, the switching determination unit 7-16 determines that the switching condition is satisfied. When the switching determination unit 7-16 determines that the switching condition is not satisfied, the switching determination unit 7-16 transmits a switching signal SW of "OFF" (step 57-16-d). In contrast, when the switching determination unit 7-16 determines that the switching condition is satisfied, the switching determination unit 7-16 transmits a switching signal SW of "ON" (step S7-16-*e*). As described above, the switching determination unit 7-16 performs the switching determination processing to switch between the first control performed by the first control unit 7A and the second control performed by the second control unit 7B.

FIG. 6 is a graph showing relationship of a signal and the like in Embodiment 1 of the invention. The description will be made with reference to FIG. 6 for a timing chart when the controller 7 shown in FIG. 3 performs the switching determination processing. FIG. 6 shows the operations of the electric motor control device 0 performed before and after switching between the first control unit 7A and the second control unit 7B. In FIG. 6, the horizontal axis shows an elapsed time. The first row in FIG. 6 shows a U-phase current Iu1 flowing through the first electric motor 1 and a U-phase current Iu2 flowing through the second electric motor 2. The second row in FIG. 6 shows the speed command value ω_ref. The third row in FIG. 6 shows an angle Δθ formed between the current vectors described with reference to FIG. 4. The fourth row in FIG. 6 shows the d-axis current command value Id_ref. The fifth row in FIG. 6 shows the calculation start flag sent to the first speed estimator 7-7 and the second speed estimator 7-10. The sixth row in FIG. 6 shows the switching signal SW. As shown in FIG. 6, the first electric motor 1 and the second electric motor 2 are accelerated through periods T1 to T4 to rotate at a high speed. It can be seen from FIG. 6 that the angle Δθ formed between the current vectors and the speed command value ω_ref have the correlation. Accordingly, the angle Δθ formed between the current vectors can be utilized for switching between ON and OFF of the calculation start flag or the switching signal SW. Next, the rotation of the first electric motor 1 and the second electric motor 2 in the period T1 to the period T4 will be described. In a period from the period T1 to the period T3, the first control is performed by the first control unit 7A. In the period T4, the second control is performed by the second control unit 7B.

In the period T1, the first electric motor 1 and the second electric motor 2 are in a stopped state. The controller 7 performs the d-axis current feedback control to perform the synchronization pull-in operation. Specifically, the speed command value ω_ref is 0 [rpm], and the first control is performed by the first control unit 7A. The first d-axis current command value setting device 7-1A of the controller 7 shown in FIG. 2 sets the current value C1 that can perform the synchronization pull-in operation as the d-axis current command value Id_ref_A. Then, the first switcher 7-12 outputs the d-axis current command value Id_ref_A as the d-axis current command value Id_ref. The first electric motor 1 and the second electric motor 2 are controlled to follow the current value C1, and an exciting current flows through each electric motor. In FIG. 6, the d-axis current command value Id_ref is a command to supply the current value C1 in a stepwise manner. However, a command to gradually supply the current value C1 can also achieve the synchronization pull-in operation in the same manner.

In the period T2, control is performed by position sensorless. Therefore, in speed estimation performed by the first speed estimator 7-7 and the second speed estimator 7-10, a speed estimation error occurs due to the effect of a voltage error in a low speed range. Accordingly, the controller 7 accelerates the first electric motor 1 and the second electric motor 2 to a speed that assumes the speed threshold A1 set in advance. Further, the d-axis current command value Id_ref_A outputted from the first d-axis current command value setting device 7-1A and set to the current value C1 is outputted as the d-axis current command value Id_ref.

In the period T3, when the speed command value ω_ref exceeds the speed threshold A1 set in advance, the switching determination unit 7-16 of the controller 7 switches the signal for the calculation start flags of the first speed estimator 7-7 and the second speed estimator 7-10 from "OFF" to "ON". The first speed estimator 7-7 starts the calculation of the estimated speed value ω_obs1 of the first electric motor 1. Further, the second speed estimator 7-10 starts the calculation of the estimated speed value ω_obs2 of the second electric motor 2. Thereafter, the switching determination unit 7-16 continues to output "ON" as the signal for the speed estimator start flag. Although not shown in FIG. 6, a signal for the speed estimator start flag is switched to "OFF" at the timing at which the switching signal SW is switched to "OFF". Further, as described above, the calculation of the angle Δθ formed between the current vector Iol and the current vector Io2 is also started. The angle Δθ formed between the current vector Iol and the current vector Io2 varies according to load characteristics of the first electric motor 1 and load characteristics of the second electric motor 2. The d-axis current command value Id_ref_A outputted from the first d-axis current command value setting device 7-1A and set to the current value C1 is outputted as the d-axis current command value Id_ref.

In the period T4, when the switching determination unit 7-16 performs the processing in step S7-16-*c* shown in FIG. 3, and determines that the above-mentioned switching condition is satisfied, the switching signal SW is switched from an "OFF" signal to an "ON" signal. Control performed by the controller 7 is shifted from the first control performed by the first control unit 7A to the second control performed by the second control unit 7B. Therefore, the first switcher 7-12 outputs the d-axis current command value Id_ref_B as the d-axis current command value Id_ref. The second d-axis current command value setting device 7-1B of the controller 7 causes the d-axis current command value Id_ref to gradually decrease from the current value C1 according to the acceleration of the first electric motor 1 and the second electric motor 2. As a result, the U-phase current Iu1 of the first electric motor 1 and the U-phase current Iu2 of the second electric motor 2 gradually decreases.

As described above, in the electric motor control device 0 of Embodiment 1, the first control and the second control are switched according to drive information on at least one of the first electric motor 1 and the second electric motor 2. Accordingly, switching can be performed by taking into account load characteristics of each electric motor and hence, it is possible to increase certainty for simultaneously driving two or more electric motors to a high speed.

In the electric motor control device 0 of Embodiment 1, the calculation of the estimated speed value of each electric motor is started at a stage earlier than the timing at which the first control performed by the first control unit 7A is switched to the second control performed by the second control unit 7B. Therefore, it is possible to prevent that an estimated speed error occurs in the electric motor due to a switching shock, leading to acceleration failure of the electric motor.

Further, in the electric motor control device 0 of Embodiment 1, the angle Δθ formed between the current vectors of the respective electric motors is used as the switching condition for switching from the first control performed by the first control unit 7A to the second control performed by the second control unit 7B. Therefore, it is possible to switch to the speed feedback control in a state where an extremely high load is applied to either one of the electric motors. Accordingly, the electric motor control device 0 of Embodiment 1 is robust to disturbance response and hence, step-out can be suppressed whereby acceleration failure in the electric motor can be suppressed.

In the electric motor control device 0 of Embodiment 1, a d-axis current is set to a low value at the timing at which the first control performed by the first control unit 7A is switched to the second control performed by the second control unit 7B and hence, it is possible to prevent that an extremely high electric current flows after control is switched. Further, it is possible to obtain an advantageous effect that the electric motors can be accelerated to a high speed. In addition, an exciting current can be suppressed at a low value in a high speed range and hence, copper loss of the respective electric motors can be suppressed to a low level whereby it is also possible to obtain an advantageous effect of increasing efficiency of the electric motor.

Embodiment 2

Next, an electric motor control device 0 of Embodiment 2 will be described. The electric motor control device 0 of Embodiment 2 differs from the electric motor control device 0 of Embodiment 1 in contents of the switching determination processing performed by the switching determination unit 7-16. The equipment configuration of the electric motor control device 0 and the configuration of the controller 7 are substantially equal to corresponding content described in Embodiment 1. In Embodiment 2, the specific processing in the electric motor control device 0 of Embodiment 2 will be described.

Figure 7:
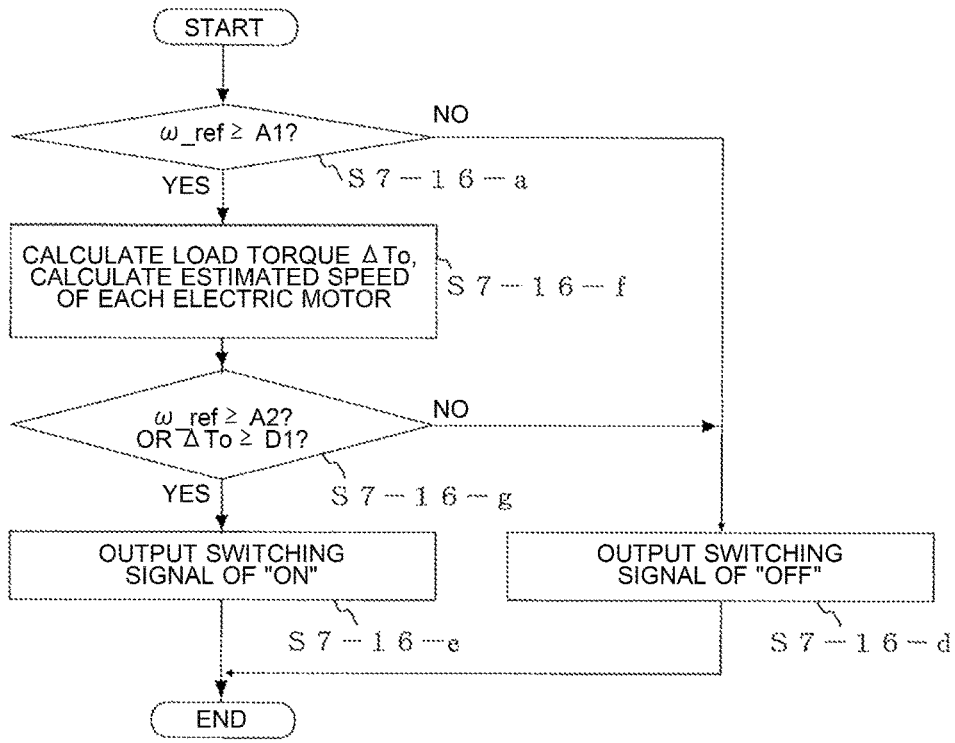
FIG. 7 is a chart for describing a procedure of switching determination processing in Embodiment 2 of the invention.

FIG. 7 is a chart for describing a procedure of switching determination processing in Embodiment 2 of the invention. The determination processing in Embodiment 2 differs from the determination processing in Embodiment 1 shown in FIG. 3 in a point that the switching determination unit 7-16 performs step S7-16-*f* in place of step S7-16-*b*. The determination processing in Embodiment 2 also differs from the determination processing in Embodiment 1 shown in FIG. 3 in a point that the switching determination unit 7-16 performs step S7-16-*g* in place of step S7-16-*c*. The processing performed in other steps is substantially equal to the corresponding processing described in Embodiment 1.

In step S7-16-*f*, the switching determination unit 7-16 transmits a signal for switching the speed estimator start flags of the first speed estimator 7-7 and the second speed estimator 7-10 to "ON". Then, the switching determination unit 7-16 causes the first speed estimator 7-7 to start the calculation of the estimated speed value ω_obs1 of the first electric motor 1. The switching determination unit 7-16 also causes the second speed estimator 7-10 to start the calculation of the estimated speed value ω_obs2 of the second electric motor 2.

Further, the switching determination unit 7-16 performs estimation calculation of a load torque To1 of the first electric motor 1 and a load torque To2 of the second electric motor 2. In calculating the load torque, it is sufficient to calculate the load torque of the first electric motor 1 based on Expression (1), for example. In Expression (1), φ1 denotes the induced voltage constant of the first electric motor 1. Further, Pm1 denotes the number of pole pairs of the first electric motor 1, and Iq1 denotes the q-axis current of the first electric motor 1. The induced voltage constant φ1 of the first electric motor 1 and the number Pm1 of pole pairs of the first electric motor 1 are known parameters. Therefore, the load torque To1 of the first electric motor 1 can be calculated with the use of the q-axis current Iq1 of the first electric motor 1 outputted from the first coordinate converter 7-6. In the same manner, the load torque To2 of the second electric motor 2 can also be calculated with the use of the induced voltage constant of the second electric motor 2, the number of pole pairs of the second electric motor 2, and the q-axis current Iq2 of the second electric motor 2 outputted from the second coordinate converter 7-9.

[Expression 1]

$$To1 = \phi1 \times Pm1 \times Iq1 \quad (1)$$

The switching determination unit 7-16 also calculates a differential torque ΔTo between the load torque To1 of the first electric motor 1 and the load torque To2 of the second electric motor 2, the differential torque ΔTo being drive information which determines control switching. In step S7-16-*f*, it is sufficient that the first speed estimator 7-7 starts the calculation of the estimated speed value ω_obs1 of the first electric motor 1, and the second speed estimator 7-10 starts the calculation of the estimated speed value ω_obs2 of the second electric motor 2 before the first control unit 7A and the second control unit 7B are switched. For example, in the case where the switching determination unit 7-16 has a timer function, the switching determination unit 7-16 may be adjusted to transmit a signal for switching the calculation start flag to "ON" before the first control unit 7A and the second control unit 7B are switched.

After the switching determination unit 7-16 transmits the signal for switching the speed estimator start flag to "ON", the switching determination unit 7-16 determines whether a switching condition is satisfied (step S7-16-*g*). The switching conditions are as follows. The speed command value $\omega\_ref$ is equal to or greater than the speed threshold A2 set in advance in the same manner as Embodiment 1. In Embodiment 2, the differential torque ΔTo calculated in step S7-16-$f$ is equal to or greater than a load torque threshold D1 set in advance.

When either one of the above-mentioned conditions is satisfied, the switching determination unit 7-16 determines that the switching condition is satisfied. When the switching determination unit 7-16 determines that the switching condition is not satisfied, the switching determination unit 7-16 transmits a switching signal SW of "OFF" (step S7-16-$d$). In contrast, when the switching determination unit 7-16 determines that the switching condition is satisfied, the switching determination unit 7-16 transmits a switching signal SW of "ON" (step S7-16-$e$). As described above, the switching determination unit 7-16 performs the switching determination processing to switch between the first control performed by the first control unit 7A and the second control performed by the second control unit 7B.

As described above, in the electric motor control device 0 of Embodiment 2, a differential torque ΔTo between loads on the respective electric motors is used as the switching condition in switching from the first control performed by the first control unit 7A to the second control performed by the second control unit 7B. Therefore, even when an extremely high load torque is applied to either one of the electric motors, thus causing a difference in load torque, it is possible to switch to the second control performed by the second control unit 7B. Accordingly, step-out of the electric motor can be suppressed in a high speed range and hence, it is possible to suppress acceleration failure in the electric motors.

Embodiment 3

Next, an electric motor control device 0 of Embodiment 3 will be described. The electric motor control device 0 of Embodiment 3 differs from the electric motor control device 0 of Embodiment 1 in contents of the switching determination processing performed by the switching determination unit 7-16. The equipment configuration of the electric motor control device 0 and the configuration of the controller 7 are substantially equal to corresponding content described in Embodiment 1. In Embodiment 3, the specific processing in the electric motor control device 0 of Embodiment 3 will be described.

Figure 8:
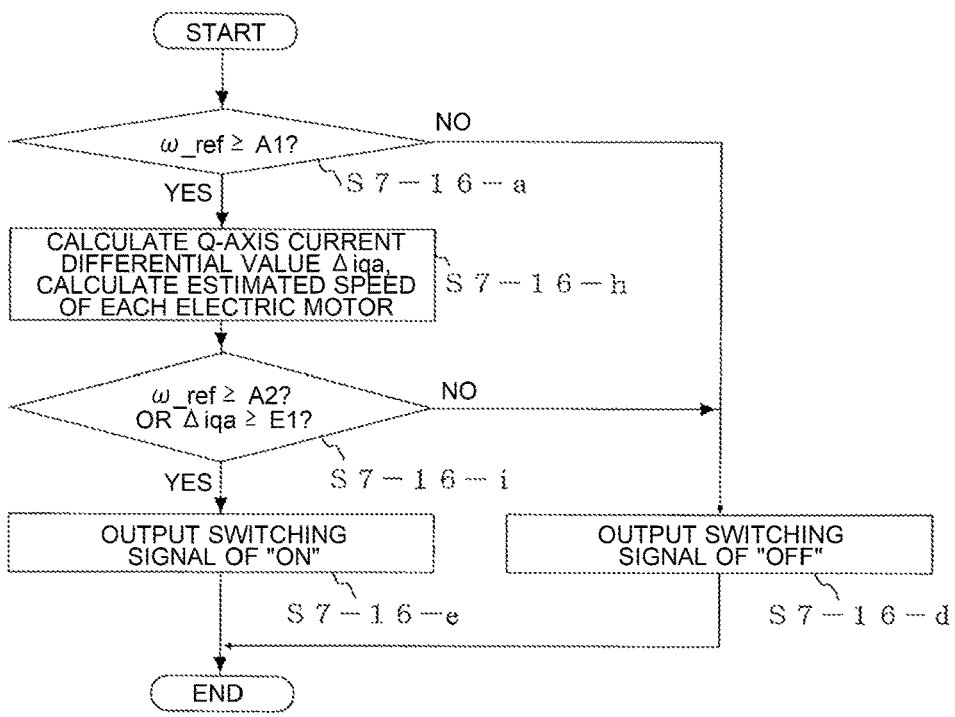
FIG. 8 is a chart for describing a procedure of switching determination processing in Embodiment 3 of the invention.

FIG. 8 is a chart for describing a procedure of switching determination processing in Embodiment 3 of the invention. The determination processing in Embodiment 3 differs from the determination processing in Embodiment 1 shown in FIG. 3 in a point that the switching determination unit 7-16 performs step S7-16-$h$ in place of step S7-16-$b$. The determination processing in Embodiment 3 also differs from the determination processing in Embodiment 1 shown in FIG. 3 in a point that the switching determination unit 7-16 performs step S7-16-$i$ in place of step S7-16-$c$. The processing performed in other steps is substantially equal to the corresponding processing described in Embodiment 1.

In step S7-16-$h$, the switching determination unit 7-16 transmits a signal for switching the speed estimator start flags of the first speed estimator 7-7 and the second speed estimator 7-10 to "ON". Then, the switching determination unit 7-16 causes the first speed estimator 7-7 to start the calculation of the estimated speed value $\omega\_obs1$ of the first electric motor 1. The switching determination unit 7-16 also causes the second speed estimator 7-10 to start the calculation of the estimated speed value $\omega\_obs2$ of the second electric motor 2.

Further, the switching determination unit 7-16 calculates a q-axis current differential value Δiqa from the q-axis current Iq1 of the first electric motor 1 outputted from the first speed estimator 7-7 and the q-axis current Iq2 of the second electric motor 2 outputted from the second speed estimator 7-10, the q-axis current differential value Δiqa being drive information which determines control switching. In step S7-16-$h$, it is sufficient that the first speed estimator 7-7 starts the calculation of the estimated speed value $\omega\_obs1$ of the first electric motor 1, and the second speed estimator 7-10 starts the calculation of the estimated speed value $\omega\_obs2$ of the second electric motor 2 before the first control unit 7A and the second control unit 7B are switched. For example, in the case where the switching determination unit 7-16 has a timer function, the switching determination unit 7-16 may be adjusted to transmit a signal for switching the calculation start flag to "ON" before the first control unit 7A and the second control unit 7B are switched.

After the switching determination unit 7-16 transmits the signal for switching the speed estimator start flag to "ON", the switching determination unit 7-16 determines whether a switching condition is satisfied (step S7-16-$g$). The switching conditions are as follows. The speed command value $\omega\_ref$ is equal to or greater than the speed threshold A2 set in advance in the same manner as Embodiment 1. In Embodiment 3, the q-axis current differential value Δiqa calculated in step S7-16-$h$ is equal to or greater than a q-axis current threshold E1 set in advance.

When either one of the above-mentioned conditions is satisfied, the switching determination unit 7-16 determines that the switching condition is satisfied. When the switching determination unit 7-16 determines that the switching condition is not satisfied, the switching determination unit 7-16 transmits a switching signal SW of "OFF" (step S7-16-$d$). In contrast, when the switching determination unit 7-16 determines that the switching condition is satisfied, the switching determination unit 7-16 transmits a switching signal SW of "ON" (step S7-16-$e$). As described above, the switching determination unit 7-16 performs the switching determination processing to switch between the first control performed by the first control unit 7A and the second control performed by the second control unit 7B.

As described above, in the electric motor control device 0 of Embodiment 3, the q-axis current differential value Δiqa between the respective electric motors is used as the switching condition in switching from the first control performed by the first control unit 7A to the second control performed by the second control unit 7B. Therefore, even when an extremely high load is generated in either one of the electric motors, it is possible to switch to the second control performed by the second control unit 7B to perform the q axis current feedback control. Accordingly, it is possible to accelerate the electric motors while control stability of the electric motors is maintained in a high speed range.

Embodiment 4

Next, an electric motor control device 0 of Embodiment 4 will be described. The electric motor control device 0 of Embodiment 4 differs from the electric motor control device 0 of Embodiment 1 in contents of the switching determination processing performed by the switching determination unit 7-16. The equipment configuration of the electric motor control device 0 and the configuration of the controller 7 are substantially equal to corresponding content described in Embodiment 1. In Embodiment 4, the specific processing in the electric motor control device 0 of Embodiment 4 will be described.

Figure 9:
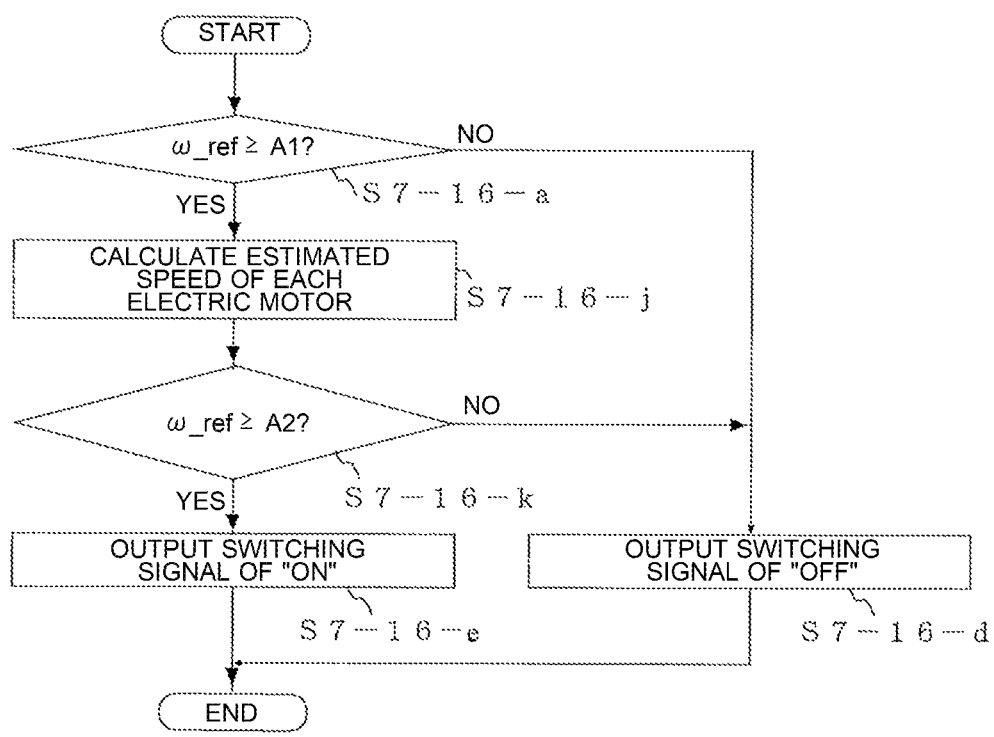
FIG. 9 is a chart for describing a procedure of switching determination processing in Embodiment 4 of the invention.

FIG. 9 is a chart for describing a procedure of switching determination processing in Embodiment 4 of the invention. The determination processing in Embodiment 4 differs from the determination processing in Embodiment 1 shown in FIG. 3 in a point that the switching determination unit 7-16 performs step S7-16-*j* in place of step S7-16-*b*. The determination processing in Embodiment 4 also differs from the determination processing in Embodiment 1 shown in FIG. 3 in a point that the switching determination unit 7-16 performs step S7-16-*k* in place of step S7-16-*c*. The processing performed in other steps is substantially equal to the corresponding processing described in Embodiment 1.

In step S7-16-*j*, the switching determination unit 7-16 transmits a signal for switching the speed estimator start flags of the first speed estimator 7-7 and the second speed estimator 7-10 to "ON". Then, the switching determination unit 7-16 causes the first speed estimator 7-7 to start the calculation of the estimated speed value ω_obs1 of the first electric motor 1. The switching determination unit 7-16 also causes the second speed estimator 7-10 to start the calculation of the estimated speed value ω_obs2 of the second electric motor 2.

After the switching determination unit 7-16 transmits the signal for switching the speed estimator start flag to "ON", the switching determination unit 7-16 determines whether a switching condition is satisfied (step S7-16-*k*). The switching condition is as follows. The speed command value ω_ref is equal to or greater than the speed threshold A2 set in advance.

When the switching determination unit 7-16 determines that the above-mentioned switching condition is not satisfied, the switching determination unit 7-16 transmits a switching signal SW of "OFF" (step S7-16-*d*). In contrast, when the switching determination unit 7-16 determines that the switching condition is satisfied, the switching determination unit 7-16 transmits a switching signal SW of "ON" (step S7-16-*e*). As described above, the switching determination unit 7-16 performs the switching determination processing to switch between the first control performed by the first control unit 7A and the second control performed by the second control unit 7B.

As described above, in the electric motor control device 0 of Embodiment 4, the calculation of speed estimation is started based on the speed command value ω_ref, and the first control performed by the first control unit 7A and the second control performed by the second control unit 7B are switched according to the speed command value ω_ref. Therefore, even when a situation occurs where loads applied to the respective electric motors continuously fluctuate before control is switched, the respective electric motors can be accelerated to a high speed. In other words, there is no effect of a calculation error in estimated speed value and hence, the respective electric motors can be accelerated to a high speed.

Embodiment 5

In above-mentioned Embodiment 1 to Embodiment 4, the configuration has been described where two electric motors, that is, the first electric motor 1 and the second electric motor 2, are connected in parallel to one inverter 5. However, the configuration is not limited to the above. A configuration may be adopted where three or more electric motors are connected in parallel to one inverter 5.

Further, in above-mentioned Embodiment 1 to Embodiment 4, the description has been made for the operation for switching control when the first electric motor 1 and the second electric motor 2 are accelerated. Also in the case where the first electric motor 1 and the second electric motor 2 are decelerated, the application of the processing described in any one of above-mentioned Embodiment 1 to Embodiment 4 allows the operation for switching control to be achieved.

In above-mentioned Embodiment 1 to Embodiment 4, the electric motor control device 0 that is utilized for the fan of an air-conditioning device has been described. However, the application of the electric motor control device 0 is not limited to the above. Also in the case where other electric motors of an automobile or the like have different load torque characteristics, any combination of the control in Embodiment 1 to the control in Embodiment 4 may be utilized.

The invention claimed is:

1. An electric motor control device that drives and controls a plurality of electric motors connected in parallel, the electric motor control device comprising:
   a power conversion device configured to convert power from a power supply, and to supply the power to the plurality of electric motors;
   a current detection device configured to detect an electric current flowing through each of the plurality of electric motors; and
   a controller configured to control the power conversion device according to a speed command value from an external device and a current value relating to detection from the current detection device, wherein
   the controller includes
   a first control unit configured to perform first control on each of the plurality of electric motors based on the electric current,
   a second control unit configured to perform second control of controlling the plurality of electric motors such that an estimated speed of each of the plurality of electric motors obtained based on the current value follows the speed command value, and
   a switching determination unit configured to perform switching determination processing of switching between the first control performed by the first control unit and the second control performed by the second control unit according to drive information on at least one or more of the plurality of electric motors.

2. The electric motor control device of claim 1, wherein the drive information is information relating to a difference in phase between the plurality of electric motors, the difference being obtained by calculation.

3. The electric motor control device of claim 1, wherein the drive information is information relating to a difference in torque between the plurality of electric motors, the difference being obtained by calculation.

4. The electric motor control device of claim 1, wherein the drive information is information relating to a difference in a q-axis current between the plurality of electric motors, the difference being obtained by calculation.

5. An electric motor control device that drives and controls a plurality of electric motors connected in parallel, the electric motor control device comprising:
   a power conversion device configured to convert power from a power supply, and to supply the power to the plurality of electric motors;

a current detection device configured to detect an electric current flowing through each of the plurality of electric motors; and a controller configured to control the power conversion device according to a speed command value from an external device and a current value relating to detection from the current detection device, wherein the controller includes a first control unit configured to perform first control on each of the plurality of electric motors based on the electric current, a second control unit configured to perform second control such that an estimated speed of each of the plurality of electric motors obtained based on the current value is controlled to follow the speed command value, and a switching determination unit configured to perform switching determination processing of switching between the first control performed by the first control unit and the second control performed by the second control unit according to the speed command value in the first control.

6. The electric motor control device of claim 1 wherein the first control unit performs the first control by causing an exciting current to flow through each of the plurality of electric motors, and the second control unit performs the second control by adjusting a voltage applied to each of the plurality of electric motors.

7. The electric motor control device of claim 6, wherein the second control unit performs control of adjusting the exciting current flowing through each of the plurality of electric motors to an electric current lower than the exciting current caused to flow by the first control unit.

8. The electric motor control device of claim 1, wherein the controller includes a speed estimator configured to calculate the estimated speed before the switching determination unit performs switching determination.

9. The electric motor control device of claim 1, wherein the switching determination unit determines whether the speed command value is equal to or greater than a set threshold and, upon determination of the speed command value being equal to or greater than the set threshold, calculation of the drive information and the estimated speed is started.

10. The electric motor control device of claim 5, wherein the first control unit performs the first control by causing an exciting current to flow through each of the plurality of electric motors, and the second control unit performs the second control by adjusting a voltage applied to each of the plurality of electric motors.

11. The electric motor control device of claim 10, wherein the second control unit performs control of adjusting the exciting current flowing through each of the plurality of electric motors to an electric current lower than the exciting current caused to flow by the first control unit.

12. The electric motor control device of claim 5, wherein the controller includes a speed estimator configured to calculate the estimated speed before the switching determination unit performs switching determination.

13. The electric motor control device of claim 5, wherein the switching determination unit determines whether the speed command value is equal to or greater than a set threshold and, upon determination of the speed command value being equal to or greater than the set threshold, calculation of the drive information and the estimated speed is started.

* * * * *